United States Patent
DeVincenzi et al.

(10) Patent No.: US 9,753,921 B1
(45) Date of Patent: Sep. 5, 2017

(54) COMMENT MANAGEMENT IN SHARED DOCUMENTS

(71) Applicant: Dropbox, Inc., San Francisco, CA (US)

(72) Inventors: Anthony DeVincenzi, San Francisco, CA (US); Matthew Blackshaw, San Francisco, CA (US); Balabhadra Graveley, San Francisco, CA (US); Igor Kofman, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 260 days.

(21) Appl. No.: 14/699,997

(22) Filed: Apr. 29, 2015

Related U.S. Application Data

(60) Provisional application No. 62/128,611, filed on Mar. 5, 2015.

(51) Int. Cl.
 *G06F 17/00* (2006.01)
 *G06F 17/30* (2006.01)
 *G06F 17/24* (2006.01)
 *G06F 17/22* (2006.01)
 *H04L 12/58* (2006.01)

(52) U.S. Cl.
 CPC .... *G06F 17/30011* (2013.01); *G06F 17/2235* (2013.01); *G06F 17/241* (2013.01); *H04L 51/04* (2013.01)

(58) Field of Classification Search
 CPC ........... G06F 17/30011; G06F 17/2235; G06F 17/241; H04L 51/04
 USPC ........................................................ 707/608
 See application file for complete search history.

(56) References Cited

U.S. PATENT DOCUMENTS

| 7,143,091 | B2 * | 11/2006 | Charnock | G06F 17/30716 |
| 7,284,191 | B2 * | 10/2007 | Grefenstette | G06F 17/30867 |
| | | | | 707/E17.058 |
| 7,797,274 | B2 * | 9/2010 | Strathearn | G06F 17/30017 |
| | | | | 707/609 |
| 8,756,278 | B2 * | 6/2014 | Sittig | G06Q 10/10 |
| | | | | 709/204 |
| 8,788,645 | B2 * | 7/2014 | Beringer | G06Q 10/10 |
| | | | | 709/204 |

(Continued)

OTHER PUBLICATIONS

Lanagan, James, et al., "SportsAnno: What Do You Think?", RIAO 2007, Carnegie Mellon Univ., Pittsburgh, PA, May 30-Jun. 1, 2007, pp. 39-55.*

(Continued)

*Primary Examiner* — Robert Stevens
(74) *Attorney, Agent, or Firm* — Fenwick & West LLP

(57) ABSTRACT

A content management system including a document management system provides documents that include comments entered by users. Comments are organized into threads; each thread is associated with a span of text in the document. When a user requests access to a document, the document management system determines which threads are visible to the user based on an audience associated with each thread. the audience comprises the user identifiers of i) the author of the document containing the thread; ii) the authors of comments included in the thread; iii) the authors of any text included in the text span for the thread; iv) any user mentioned in the text span the thread via a user primitive; v) any user mentioned in a comment via user primitive.

9 Claims, 8 Drawing Sheets

(56) References Cited

U.S. PATENT DOCUMENTS

| | | | | |
|---|---|---|---|---|
| 8,996,985 | B1* | 3/2015 | Johnston | G06F 17/241 |
| | | | | 715/230 |
| 9,069,743 | B2* | 6/2015 | Kotler | G06F 17/241 |
| 2005/0198305 | A1* | 9/2005 | Pezaris | H04L 12/585 |
| | | | | 709/227 |
| 2011/0202532 | A1* | 8/2011 | Nakazawa | G06F 17/2785 |
| | | | | 707/738 |
| 2012/0060105 | A1* | 3/2012 | Brown | H04L 12/587 |
| | | | | 715/753 |
| 2012/0221965 | A1* | 8/2012 | Takeyoshi | G06Q 50/01 |
| | | | | 715/753 |
| 2015/0195311 | A1* | 7/2015 | Lemonik | H04L 65/403 |
| | | | | 715/753 |

OTHER PUBLICATIONS

Wolfe, Joanna, "Annotation technologies: A software and research review", Computers and Composition, vol. 19, Elsevier Science, Inc., © 2002, pp. 471-497.*

Glover, Ian, et al., "Online annotation—Research and practices", Computers & Education, vol. 49, Elsevier, Ltd., © 2007, pp. 1308-1320.*

* cited by examiner

Thoughts on Subject Matter Eligibility

Here is the draft of the section. @David_Hume, @Tommy_Kuhn, please comment.

"At the same time, we tread carefully in construing this exclusionary principle lest it swallow all of patent law. At some level, "all inventions . . . embody, use, reflect, rest upon, or apply laws of nature, natural phenomena, or abstract ideas.". Thus, an invention is not rendered ineligible for patent simply because it involves an abstract concept. Applications of such concepts " 'to a new and useful end,' " we have said, remain eligible for patent protection. *Gottschalk v. Benson*, 409 U. S. 63, 67 (1972).

Accordingly, in applying the §101 exception, we must distinguish between patents that claim the " 'buildin[g] block[s]' " of human ingenuity and those that integrate the building blocks into something more, thereby transforming them into a patent-eligible invention.

---

Comments (6)

[ New Comment... ]

David_Hume    12/15/10 at 11:05 pm
This is an empirical question whether there are laws of nature. Let's discuss.

Doug_Adams    12/15/10 at 11:10 pm
I think the only Law is 42.

2 more comments

Manny_Kant    12/15/10 at 11:55 pm
I think it's imperative that we distinguish phenomena from noumenon.

[ Reply ]

Tommy_Kuhn    12/15/10 at 11:05 pm
What is a "building block"? Needs explanation. @Manny_Kant your thoughts?

[ Reply ]

*FIG. 5*

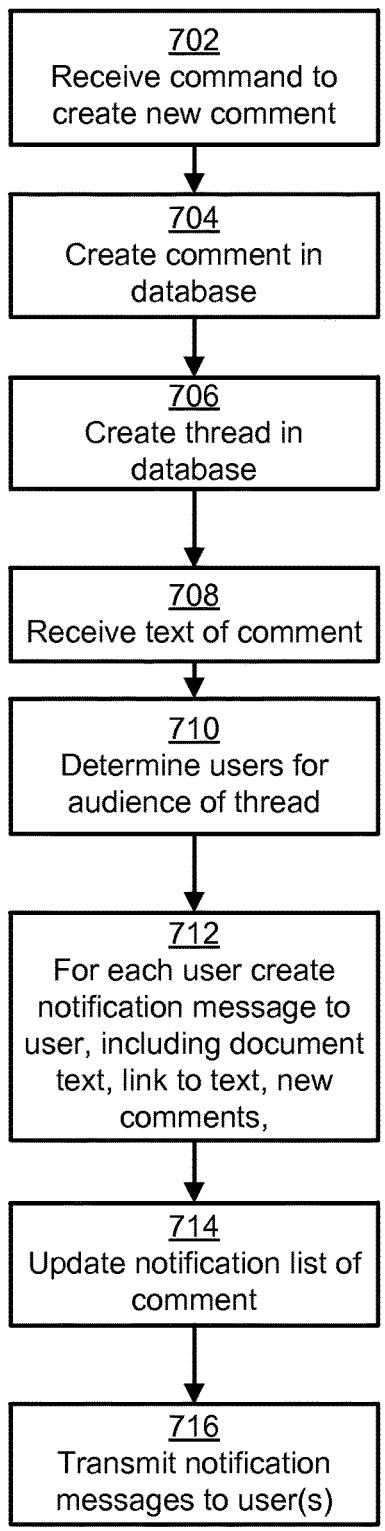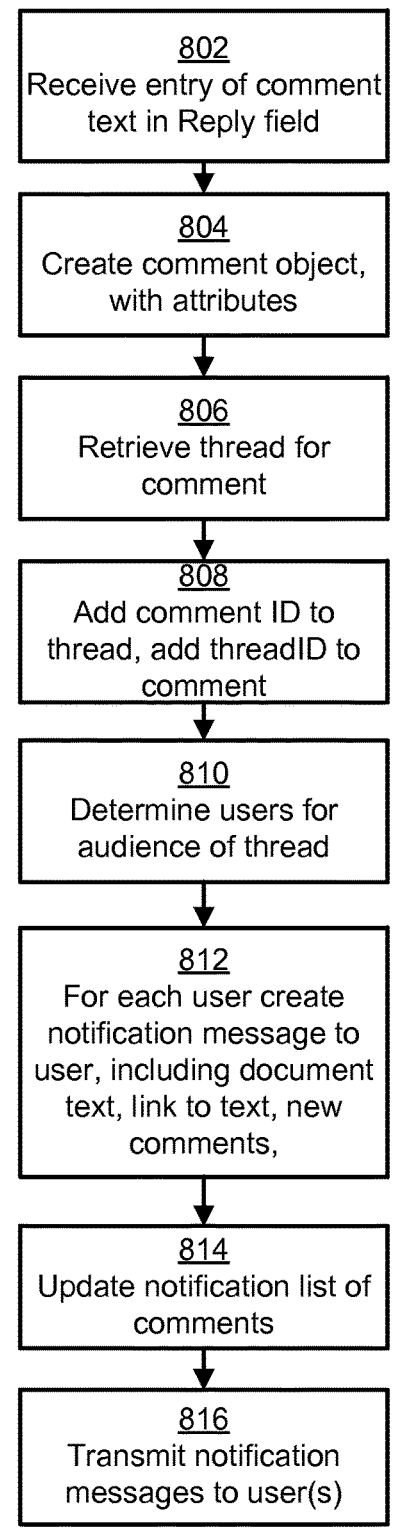
FIG. 7
FIG. 8

COMMENT MANAGEMENT IN SHARED DOCUMENTS

CROSS-REFERENCE TO RELATED APPLICATION

This application claims the benefit of U.S. Provisional Application No. 62/128,611 filed on Mar. 5, 2015, which is incorporated by reference in its entirety.

TECHNICAL FIELD

The disclosed embodiments generally relate to managing shared documents over a network. In particular, the disclosed embodiments are directed to managing comments made by users on shared documents.

BACKGROUND

Collaborative sharing of documents is typically provided by a network-based file sharing computer system that allows multiple users to access and edit the files. Generally, documents are created and edited by a specific type of native application, such as a word processor or spreadsheet application. Many such applications provide support for tracking changes to the content made by individual users as well as comments or other forms of annotation. Typically, to see the comments or changes made by others, a user must access and open the document as existing systems provide no native support for notifying the user of comments made in the document.

SUMMARY

A document management system allows users to create, edit and share documents among a plurality of other users. Users communicate with the document management system using a client application on a client device. Each user of the document management system has a user identifier, such as a unique ID number, a user name, or email address. The client application provides an interface for the user to access documents on the document management system, edit such documents, provide comments on the document and share documents with other users.

A document is composed of text portions. Each text portion has an author, the user who entered the text portion into the document. A document can have one or more comments. A comment has an author and text. The comments for a document are organized by comment threads (hereinafter "thread"), and a document can have a plurality of threads. Each thread has an author (the author of the first comment in the thread), as well as a list of one or more comments, and an audience element. Each thread is also associated with a span of text in the document, which span is selected by author of the first comment in the thread. The audience is a list of one or more users who have access to the comments in the thread, and to whom the thread is displayed when accessing the document. When a user requests access to a document, the document management system determines from the audience for each thread whether the thread is visible, that is accessible to the user based on whether the user appears in the audience of the thread. If a user is included in the audience of a thread, then the thread is visible to the user, and the document management system includes the thread in the document for display to the user. The audience of a thread includes a user by including a user identifier for the user.

In one embodiment, the audience for a thread includes each user is an author of a text portion of the document that overlaps with the text span of the thread. The document management system can determine which text portions of the document overlap with the text span of the thread by comparing a list of text portions of the document with the text span.

In one embodiment, each comment includes a notification element, which is a list of users to whom a notification regarding the comment has been sent. Each time a comment is included in a thread, the document management system generates a notification message to each user included in the audience of the thread. The notification message to a user can include one or more comments. The document management system selects a comment from the thread to include in the notification message to a specific user where the user is not listed in notification element of the comment; the absence of the user from the notification element indicates that the comment has not been previously sent to the user.

In one embodiment, a user primitive is a predefined token that can be used in the text or comments of a document to programmatically associate a specific user with the text. In one embodiment, the user primitive takes the form of @username where the "@" symbol indicates to the document management system that the following string username is the assigned name of a system user. For example, the text of the document may include the sentence "In our last meeting, @tom agreed to proceed with the new project." Similarly, user primitives may appear in the comments of a document such as the comment "@tom, please review this paragraph." When a user name appears in a user primitive in a comment in a thread, then the user is added to the audience of the thread, and as a result the thread will be made visible to the user when the user subsequently requests the document. In addition, the user will receive a notification message regarding the message.

In another aspect, a user primitive indicating a specific user can appear in the text span for a thread. When a user name appears in a user primitive in text span for a thread, then the user is added to the audience of the thread, and as a result the thread will be made visible to the user when the user subsequently requests the document. In addition, the user will receive a notification message regarding the message.

In one aspect, the document management system provides a user with access to a document stored in the document management system, via a client application on a client device. The document management system receives from the client device a selection of text made by the user, for example one or more words, lines or paragraphs, along with an instruction to create a comment for the selected text portion. The document management system creates a new thread and assigns the user identifier of the user to the author element of the thread. The document management system receives from the client application the text for the comment and inserts that text into the text element of the comment. The document management system determines whether there are any other comments associated with the text or portions of the selected text. The user identifiers for the authors of any other comments are assigned to the audience element of the text. The document management system stores the document, the thread, and the new comment in the document database.

The document management system then creates a notification message. The notification message includes a link to the document, the text span that was commented upon, and the text of the comment. The document management system further determines from the audience of the thread the users to be notified of the new comment. The document management system then transmits the notification to each of the users listed in the audience element of the thread. The notification can be transmitted via a text messaging system, an email server, or an internal messaging system. The document management system then updates the notification list for the new comment. Each user to whom the notification was transmitted receives the notification at a client application, such as an email application. From the notification, the user can access the document and comment, by selection of the link to the text. The client application passes the contents of the link to a server that retrieves the document and displays it on the client device, for example in a suitable document editing application.

The present invention has embodiments in a client device and client application, a document management system, and computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 shows an example user interface with page of a document including various comments.

FIG. 7 shows one embodiment of a method of generating notification messages for a newly created comment thread.

FIG. 8 shows one embodiment of a method of generating notification messages for a reply comment in an existing thread.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
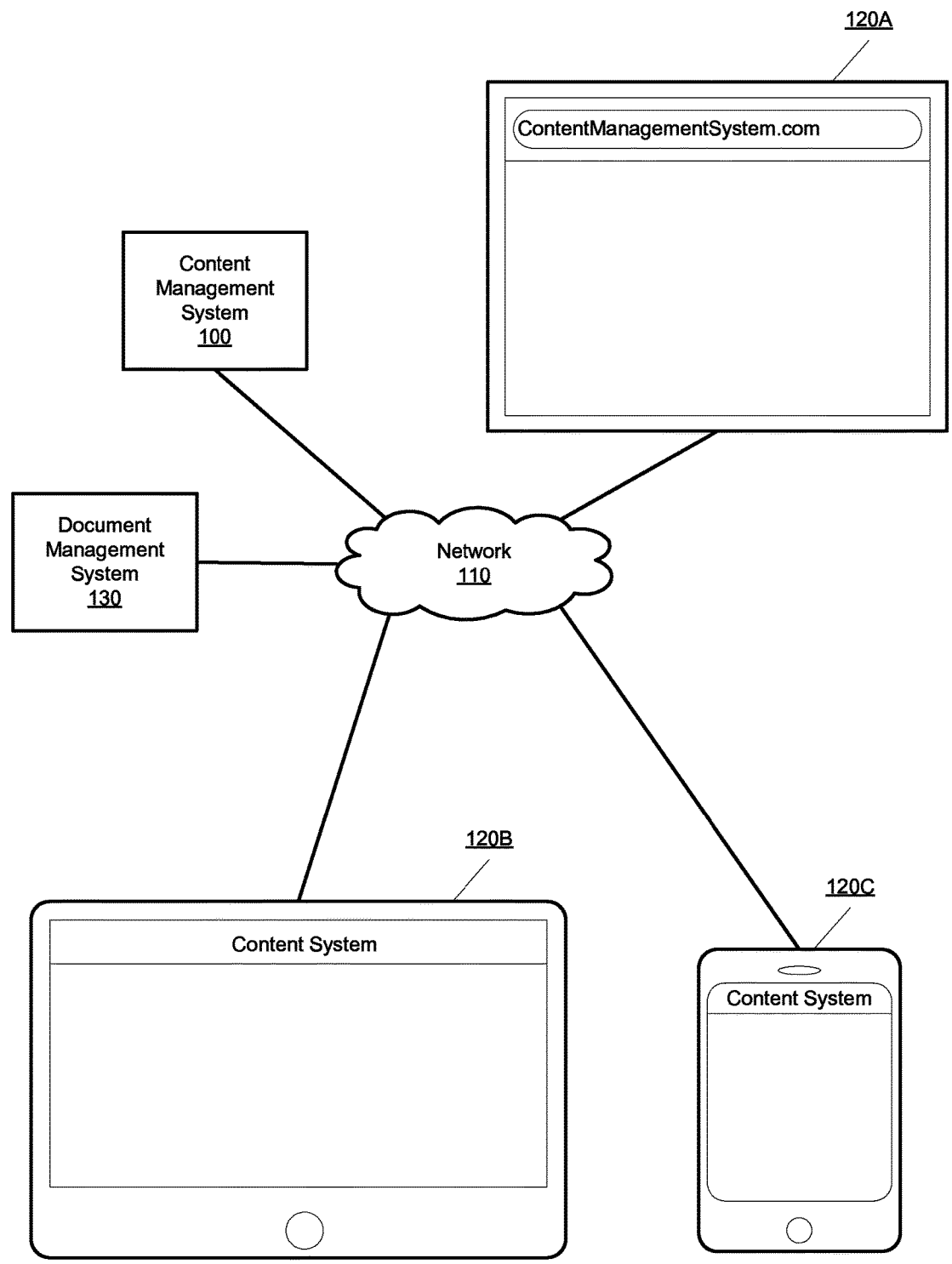
FIG. 1 shows a diagram of a system environment of a content management system and a document management system according to one embodiment.

FIG. 1 shows a system environment including content management system 100, document management system 130 and client devices 120A, 120B, 120C (collectively or individually "120"). Content management system 100 provides content sharing, synchronization for users of client devices 120. These services allow users to share content with other users of client devices 120. In addition to content sharing, content management system 100 updates shared content responsive to changes and enables users to synchronize changes in content across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object oriented, key/value etc.). In one embodiment, the content shared by content management system 100 includes content created by using third party applications, e.g., word processors, video and image editors, database management systems, spreadsheet applications, code editors, and so forth, which are independent of content management system 100.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Document management system 130 provides users of client devices 120 with the ability to create, store, access, and share documents. Documents are computer files that a user can create using a documents editor, such as a document editor which can be hosted by the document management system 130, or a document editor 270 provided on client device 120.

Client Device

Figure 2:
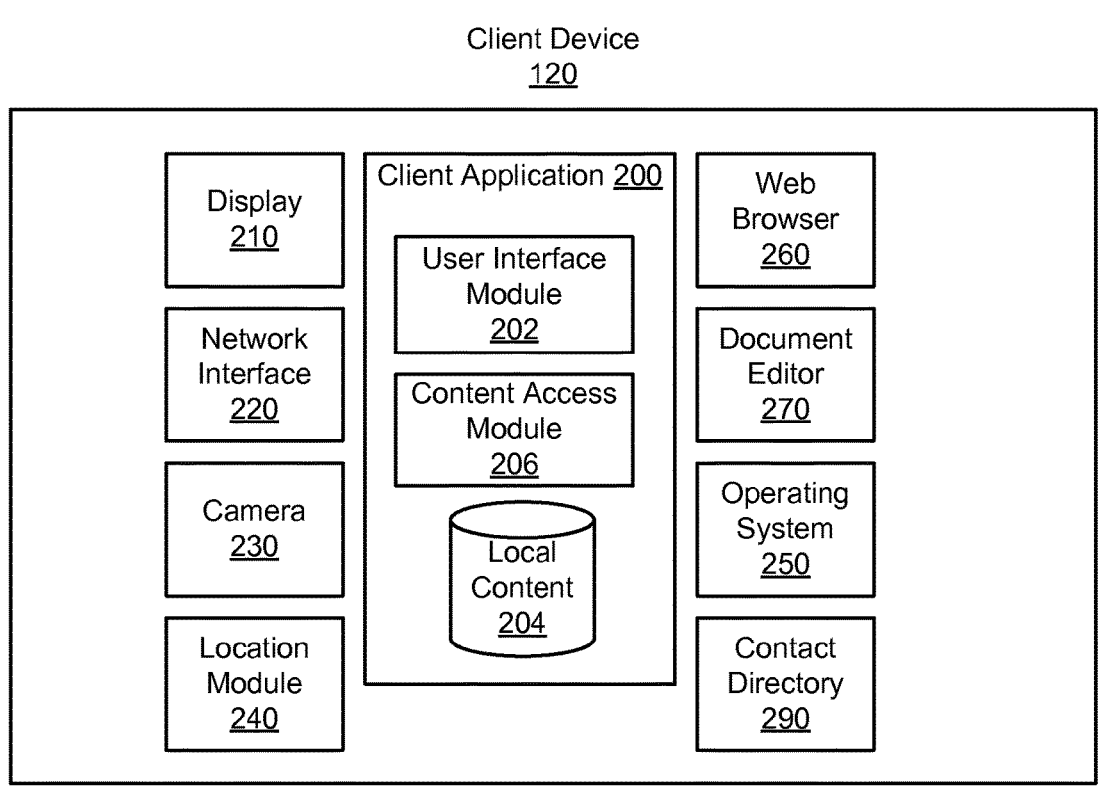
FIG. 2 shows a block diagram of the components of a client device.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying documents such as text documents, code files, mixed media files (e.g., text and graphics), presentations or the like. Operating system 250 on each device provides a local file management system and executes the various software modules such as content management system client application 200 and document editor 270. A contact directory 290 stores information on the user's contacts, such as name, telephone numbers, company, email addresses, physical address, website URLs, and the like.

Client devices 120 communicate with content management system 100 and document management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Client devices 120 access content management system 100 and document management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and document management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Content Management System

Figure 3:
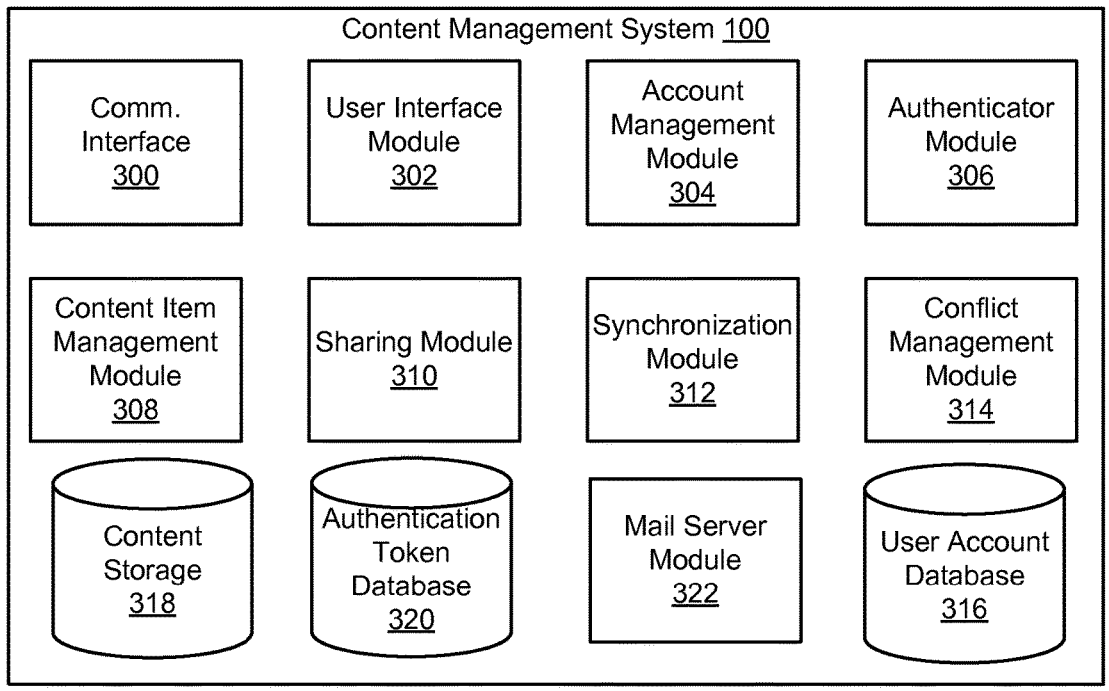
FIG. 3 shows a block diagram of the content management system.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a userID and a user name. For purposes of convenience, references herein to information such as documents or other data being "associated" with a user are understood to mean an association between a document and either of the above forms of user identifier for the user. Similarly, data processing operations on documents and users are understood to be operations performed on corresponding identifiers such as documentID and userIDs. For example, a user may be associated with a document by storing the information linking the userID and the documentID in a table, file, or other storage formats. For example, a database table organized by documentIDs can include a column listing the userID of each user associated with the document. As another example, for each userID, a file can list a set of documentIDs associated with the user. As another example, a single file can list key values pairs such as <userID, documentID> representing the association between an individual user and a document. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to identify properly and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Document Management System

Figure 4:
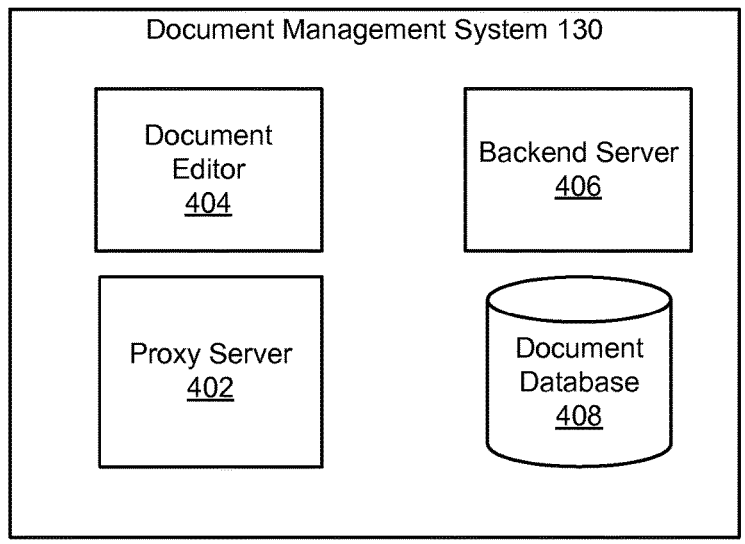
FIG. 4 shows a block diagram of the document management system.

FIG. 4 shows a block diagram of the document management system 130, according to one embodiment. Like other content items, documents may be shared and synchronized with multiple users and client devices 120, using sharing 310 and synchronization 312 modules of content management system 100. Users operate client devices 120 to create and edit documents, and to share documents with other users of client devices 120. Changes to a document by one client device 120 are propagated to other client devices 120 of users associated with that document.

In the embodiment of FIG. 1, document management system 130 is shown as separate from content management system 100, and can communicate with it to obtain its services. In other embodiments, document management system 130 is a subsystem of the component of content management system 100 that provides sharing and collaboration services for various types of content items. User account database 316 and authentication token database 320 from content management system 100 are used for accessing document management system 130 described herein.

Document management system 130 includes various servers for managing access and edits to documents. Document management system includes proxy server 402, document editor 404, and backend server 406. Proxy server 402 is responsible for handling requests from client applications 200 and passing those requests to the document editor 404. Document editor 404 manage application level requests for client applications 200 for editing and creating documents, and selectively interacting with backend servers 406 for processing lower level processing tasks on documents, and interfacing with documents database 408 as needed.

Client application 200 sends a request relating to a document to proxy server 402. Generally, a request indicates the userID ("UID") of the user, and the documentID ("NID") of the document, and additional contextual information as appropriate, such as the text of the document. When proxy server 402 receives the request, the proxy server 402 passes the request to the document editor 404. Proxy server 402 also returns a reference to the identified documents server 404 to client application 200, so the client application can directly communicate with the document editor 404 for future requests. In an alternative embodiment, client application 200 initially communicates directly with a specific document 404 assigned to the userID.

When a documents editor 404 receives a request, it determines whether the request can be executed directly or by a backend server 406. When the request adds, edits, or otherwise modifies a document the request is handled by the document editor 404. If the request is directed to a database or index inquiry, the request is executed by a backend server 406. For example, a request from client device 120 to view a document or obtain a list of documents responsive to a search term does not modify documents and is processed by backend server 406.

Content management system 100 and document management system 130 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 GB to 2 Tb of computer readable, persistent storage, and running an operating system such as LINUX or variants thereof. The operations of content management system 100 and document management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, documents servers, failover servers, network management tools and so forth are not shown so as not to obscure the features of the system. Finally, the functions and operations of content management system 100 and document management system 130 are sufficiently complex as to require implementation on a computer system, and cannot be performed in the human mind simply by mental steps.

Comment Management User Interface

Referring now to FIG. 5, shows an example user interface with page of a document 502 entitled "Thoughts on Subject Matter Eligibility," in which several comments 504 have been made. Generally, a document 502 is composed of lines of text arranged in paragraph blocks 508. A document can have zero or more comments 504. The presence of comments 504 may be indicated by underlined (preferably colored underlined) portions 510 of text, though any other formatting may be used to indicate the presence of a comment 504 (e.g., lines connecting the comments to the text, comment numbers in superscript form, etc.). The portion 510 of text with which a comment is associated is also called a text span. Comments 504 can be associated with overlapping text spans; the first and second comments 504a, 504b are applied to the text span "At some level, "all inventions . . . embody, use, reflect, rest upon, or apply laws of nature, natural phenomena, or abstract ideas." and the third comment 504c is associated with just the text "natural phenomena."

The comments 504 are arranged in a comment pane 512 positioned to the side of the body of the document 502. Each comment 504 has an author 514 (indicated by user name) and a creation date and time. A collection of comments that together form an exchange between users with respect to a single text span is a thread 518. Threads are displayed proximate the text span that is associated with the thread. In the example of FIG. 5, there are three threads, 518a, 518b, and 518c; thread 518a has a total of six comments (two shown, and "4 more comments" as indicated) and the other threads have one comment each.

A user may create a new comment or reply to existing comment. To create a comment, a user selects a span of text in the document, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the document. A user may also create a comment to include in a thread by entering text into a reply field 516 in one of the comments 504, such as the most recent comment in a thread 518.

When a user opens a document initially, the comment pane 512 is closed and the comments therein are hidden. The user can activate the comment pane 512 to show the comments by selecting text (e.g., double clicking) text that is formatted or otherwise indicated as having an associated comment. The user only sees those threads (and the comments therein) for which the user is included in the audience of the thread. The pane 512 includes a counter 524 of the current number of comments in the document that are visible to the user. Each comment can have a state, as to whether the comment is active or resolved. The counter 524 serves as a menu that the user can select from to filter the comments so as to show all comments, active comments or resolved comments.

Database Structures

Figure 6:
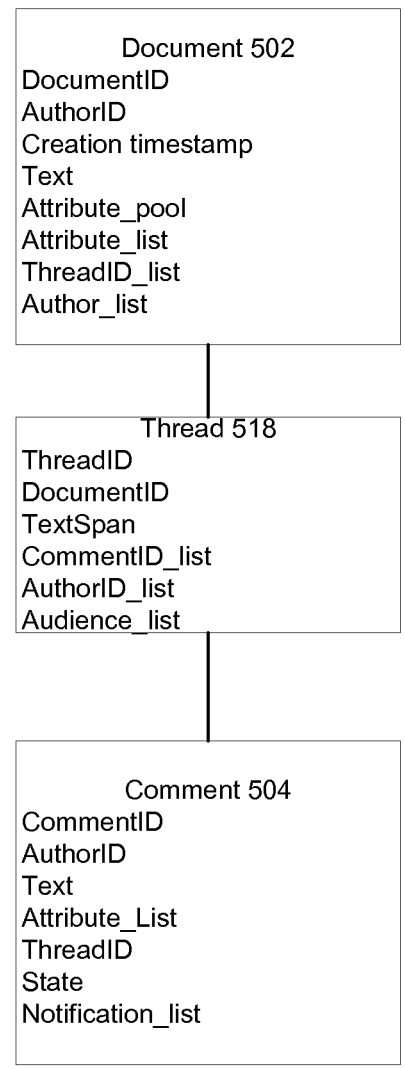
FIG. 6 shows an embodiment of the data structures for documents, comments, and threads.

Referring to FIG. 6, document database 408 stores the documents, comments, and threads as database entities, and provides programmatic access thereto for searching and retrieving these entities and is one means for performing these functions. The database 408 can be implemented in a relational form using separate tables for documents, threads, and comments, or using objects, BLOBs, files, or other structures.

Each document 502 is composed of a number of elements (equivalently fields, columns, or attributes). In one embodiment the elements are as follows:

DocumentID: a unique identifier assigned by the document management system 130 to access the document.

AuthorID: the userID of the user who created the document, and may include the user name of the user. These values may be encrypted for privacy.

Creation timestamp: indicates the date and time that the document was created.

Text: The text of the document is represented as string of ASCII characters.

Attribute_pool: Formatting attributes (e.g., bold, underline, italics, font, font size, line spacing, paragraphs, and the like) that are used in the document. The attribute pool is a set of attributeIDs used in the document; a native set of attributeIDs and associated formats are provided by the document management system 130. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| . . . | . . . |

Attribute_list: Formatting attributes are applied to portions of the text by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the document is coded for attributes. For example, the text "Text with bold, italic, and bold italic formatting." would be attribute coded as {10=0, 4=1, 2=0, 6=2, 5=0, 11=1 2, 12=0}.

ThreadID_list: a list of all threads 518 that are associated with a document.

Author_list: a sequential list of the users who have contributed to the document text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portion, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of text. When text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example with the userID of each author followed by a list of text portions edited by that user.

Each thread 518 includes the following elements:

ThreadID: unique identifier assigned by the document management system.

DocumentID: the documentID of the document that contains the thread.

TextSpan: the text span element identifies the portion of text of the document to which the thread applies, using the character position of the first character in the selected text, and the length of the portion. For example, the text span (50, 25) indicates a text portion starting at character position 50 within the document and running 25 characters in length.

CommentID_list: a list element of commentIDs of the comments 504 included in the thread 518.

AuthorID_list: the userID of the authors of comments in the thread.

Audience_list. The audience element is a list indicating the users to whom the thread and its comments are displayed when accessing the document, and to whom notifications of changes in the thread are sent. The audience comprises the userIDs of the i) the author of the document containing the thread; ii) the authors of comments included in the thread; iii) the authors of any text included in the text span for the thread; iv) any user mentioned in the text span the thread via a user primitive; v) any user mentioned in a comment via user primitive. User primitives are further described below. The inclusion of an audience for each thread allows for fine grain control of which users are notified of, and have access to specific comments as further described below.

Each comment 504 includes the following elements:

CommentID: a unique identifier assigned by the document management system 130.

AuthorID: the userID of the author of the comments.

Text: a string element storing the text of the comment.

Attribute_list: attribute list element storing the formatting attributes for the text of the comment, in the same manner as described above for documents.

ThreadID: the threadID of the thread to which the comment belongs.

State: an enumerated variable storing a value indicating the state of the comment as either active or resolved.

Notification_list: the notification element is a list of userIDs indicating the users to whom a notification of the comment has been sent, as further explained below. This list is updated each time a notification message including the comment is sent to specific user.

Document database 408 may also include a set of indices. These indices are logical in nature and may be implemented in various ways, depending on the underlying database design. A user index contains a list of all users by their userID, and for each userID there is a list of documentIDs. Each documentID identifies a document to which the user of the userID is associated and has access to. For each documentID, there is a status indicator that indicates whether the document is active or inactive for the user. A document is active for the user sharing the document until the user deletes the document. In one embodiment, when the user deletes the document, the document persists in the document database 408 remains associated with the user but status indicator is set to inactive, allowing the user to reactivate their sharing status with the document in the future. The document remains active for and associated with any other shared users. Alternatively, the document may be deleted from the document database 408, so that none of the shared users have access to it anymore. The user index is used to identify documents associated with (shared with) a given user and the status of those documents with respect to the user.

Documents database 408 can include a document index. The document index indicates, for each document, a list of userIDs of users having access to the document, and an indication of whether the user is active or inactive. This index can be an inverse of the user index and may be stored together with the user index.

Figures 10, 11:
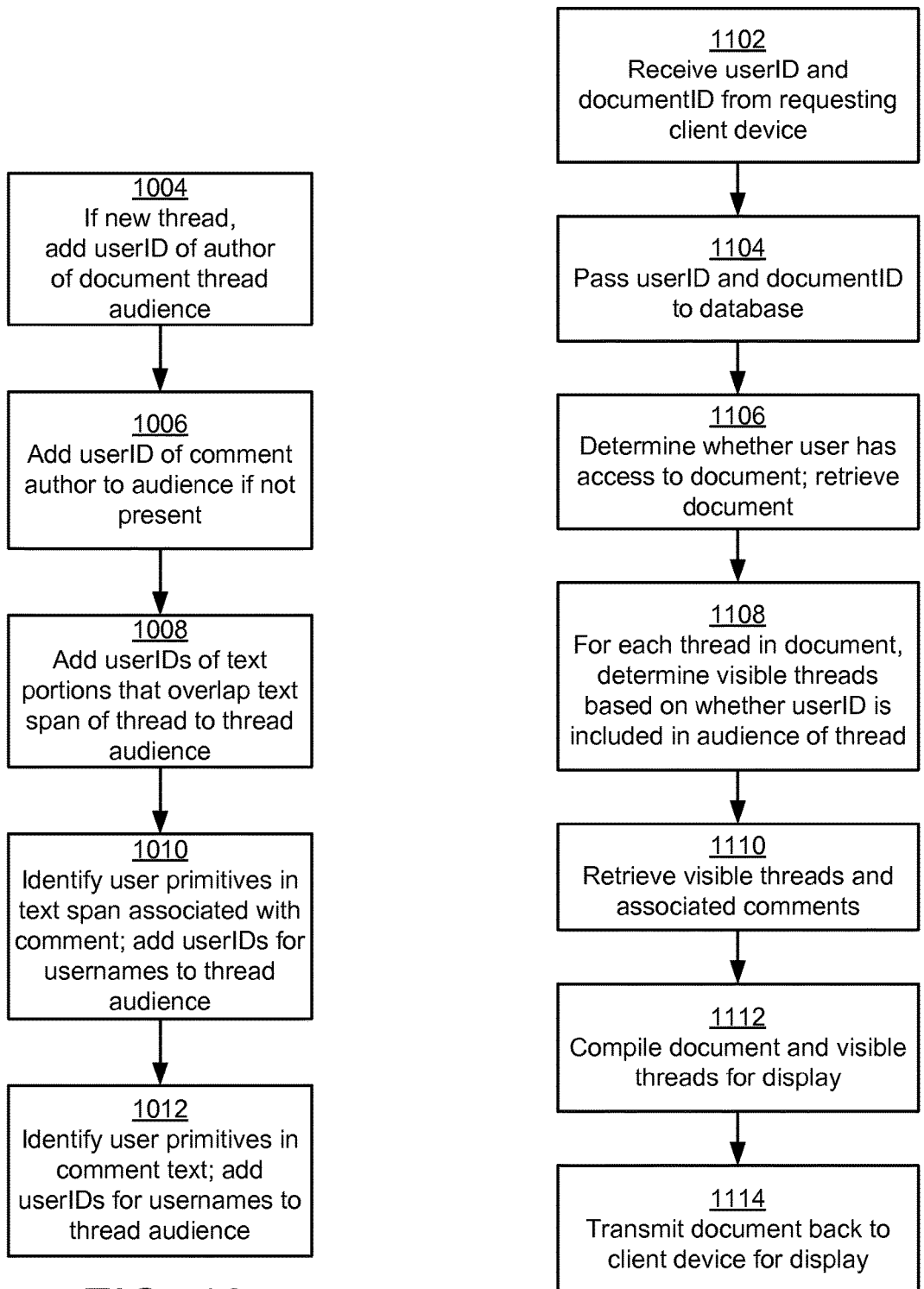
FIG. 10 shows one embodiment of a method for determining the audience for a thread.
FIG. 11 shows one embodiment of a method for selecting that threads and comments to display to a user when providing a requested document.

FIG. 11 shows one embodiment of a method for selecting which threads and comments to display to a user when providing a requested document. When user access a document, either through a web browser 260, a document editor 270, or the client application 200 of the client device 120, the document management system 130 receives 1102 the userID for the user, and the documentID for the document from the client device 120 of the user. The document management system 130 passes 1104 the documentID and the userID to the document database 408. The document database 408 looks up the documentID to access the document path to retrieve the document.

From a document index the document database 408 determines 1106 whether the user has access to the document, based on the userID and any authentication information. If so, the document database retrieves document from the database 408 and evaluates the audience element of each thread to determine 1108 if the userID of the user is included in the audience element of the thread. If the userID of the requesting user appears in the audience for a thread, then the thread and its comments will be visible to the user, otherwise the thread and its comments will not visible initially. If the thread is to be visible, the document database 408 uses the list of comments IDs in the thread to retrieve 1110 the listed comments. The visible threads and the document content are returned to the document management system 130 which compiles 1112 the document into displayable text (or provides the underlying data to the client application for rendering) by arranging the threads and comments in a sequence in the comment pane, such as illustrated in FIG. 5. The generated document is then transmitted 1114 back to the client device, which is it displayed to the user.

User Primitives

In one embodiment, the document management system 130 is configured to recognize particular text patterns as functional primitives that activate various functions of the document management system 130. One type of functional primitive is a user primitive. A user primitive is indicated by a predetermined token followed by the user name of a user. The user primitive is used in the text or comments of a document to programmatically associate a specific user with the document or comment. Colloquially, the appearance of a user primitive identifying a user name is called a mention of a user.

In one embodiment, the user primitive takes the form of @username where the "@" symbols is a predetermined token indicates to the document management system 130 that the following string username is the user name of a system user. Referring to FIG. 5, several examples of user primitives 520 are illustrated. First in the text of the document, the first sentence includes the user primitives "@David_Hume" and "@Tommy_Kuhn". The user primitive "@Manny_Kant" is also shown in the text of comment 504c. The document management system 130 recognizes these primitives as it processes the text of the document and comments.

When a user primitive indicating specific user appears in the text span for a thread, or the text of a comment, the document management system 130 includes the userID for the indicated user in the audience for thread containing the comment. This allows the mentioned user to see the entire thread in which they are mentioned when accessing the document (since access to the thread when opening a document is determined by presence of a user's ID in the audience), as well for a mechanism to notify the user, as next described.

In one embodiment, when a user primitive occurs elsewhere in the document, but outside of the text span for the thread, the userID for the mentioned user is included in the audience. For example, if a user is mentioned in the same paragraph as the text span for thread, the userID for the user is included in the audience.

Notification of Comments

The document management system 130 is configured to notify a user of new comments or revised comments in a thread when the user is included in the audience of the thread including the comment.

Referring to FIG. 7, there is shown one embodiment of a method of generating notification messages for a newly created comment thread as may be performed by the document management system 130. First, the document management system 130 receives 702 a command to create the new comment. As described above, a new comment is associated with a text span selected by the user. The document management system 130 creates 704 a comment in the database 408 and assigns a commentID, and the userID of the user to the authorID of the comment. The document management system 130 creates 706 a thread object in the database 408, assigning a new threadID, the text span selected by the user, and adding the commentID for the comment to the commentID list for the thread.

The document management system 130 displays a comment 504 in the comment pane 512 and receives 708 the text of the comment (including any text formatting) input by the user.

The document management system 130 retrieves 710 the audience for the thread. As described above, the audience comprises the userIDs of i) the author of the document containing the thread; ii) the authors of comments included in the thread; iii) the authors of any text included in the text span for the thread; iv) any user mentioned in the text span the thread via a user primitive; v) any user mentioned in a comment via user primitive. The determination of the thread audience is further described below with respect to FIG. 10.

For each user whose userID is included in the audience of the thread, the document management system 130 creates 712 a notification message addressed to the user. The notification message includes the user name of the user who created the most recent comment (looked up from the authorID in that comment); the text span that was commented upon, a link to the document and the comment, and preferably the text of comments that have not been previously seen by that specific user. The link includes addressing information of a network path to the document (e.g., a URL to the document management system 130 including a query string with the document ID, and the location of text span). The document management system 130 provides the created notification message(s) to mail server module 322. The document management system 130 updates 714 the notification list of the comment with the userIDs from the audience.

For each notification, the email server module 322 looks up the email address corresponding to the userID for the recipient, packages the notification message into an email using the obtained email address, and transmits 716 the notification message to the user.

As noted, a comment can be created by replying to a comment in an existing thread. FIG. 8 shows one embodiment of a method of generating notification messages for a reply comment in an existing thread, as may be performed by the document management system 130 in coordination with a document editor. The document management system 130 receives 802 the entry of a comment text in the reply field of an existing comment. The document management system 130 creates a new comment in the database 408, along with the attributes for the authorID of the user who replied, the text of the comment and formatting attributes. Since the new comment is in the context of an existing thread, the document management system 130 retrieves the thread information. The commentID is added 808 to the list of commentIDs stored in the thread, the authorID is added to the authorID list for the thread, and the threadID is added to the comment. The document management system 130 retrieves 810 the userIDs for the audience.

For each user whose userID is included in the audience of the thread, the document management system 130 creates 812 a notification message addressed to the user. The notification message includes the user name the user who created the reply message (looked up from the authorID in that comment); a link to the document and the comment, and preferably the text of comments that have not been previously seen by that specific user. The link includes a network path to the document (e.g., a URL to the document management system 130 including a query string with the document ID, and the location of text span). The document management system 130 updates 814 the notification list of the reply comment (and any comments not previously sent) with the userIDs from the audience.

The document management system 130 provides the created notification message(s) to mail server module 322. For each notification message, the email server module 322 looks up the email address corresponding to the userID for the recipient, and packages the notification message into an email using the obtained email address, and transmits 816 the notification message to the user.

In one embodiment, when generating the notification messages, the document management system 130 determines whether a user to whom a notification message is to be sent is authorized to access the document that contains the comment, for example where the document has been shared with the user. If the user is not authorized to access the document, the document management system 130 sends a request to the author of the document notifying the author that the user need permission to access the document, and including a link by which the author can author the access, for example by sending an invitation to the user to share the document.

Notification Messages

The format and content of a notification message may vary depending on the context in which the comment was created, and the how the particular user was selected to receive a notification message.

Figure 9A:
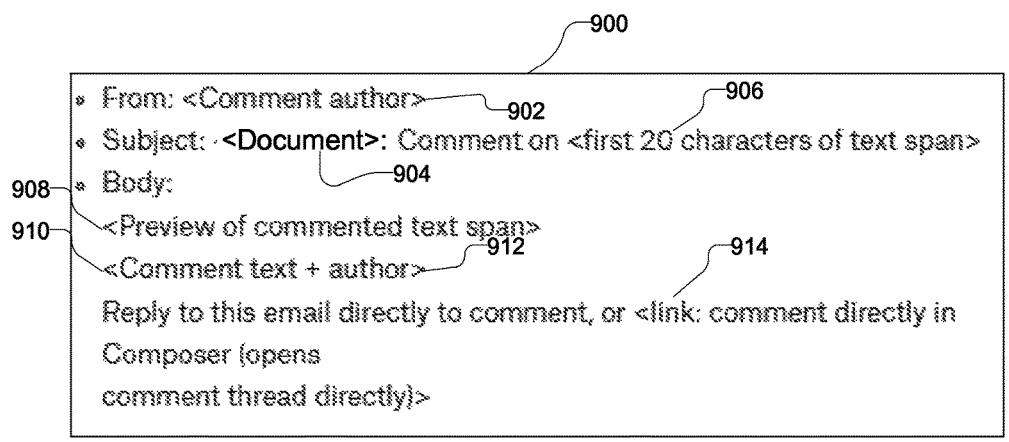
FIGS. 9a and 9b shows examples of templates for notification messages.

FIG. 9a shows an example of a template for an email 900 type notification message to a user providing notification of a new comment. In the email, the sender 902 is shown as comment author, even though the document management system 130 automatically created the email message, and the user did not create or send the email in fact. The subject line includes name 904 of the document, followed by the text "Comment on" and then the an extract 906 of the text span from the document, such as the first 20 or so characters of the text span. In the body of the message is shown a preview 908 the entirety of the text span that is commented upon, followed by the comment text 910 and the user name 912 of the author of the comment. The notification message includes a link 914 to the document and the comment, so that the recipient can select the link and access the comment in the document management system 130. This format of the notification message is used to send a notification to users listed in the audience of the thread and in the notification list of previous comments in the thread. In these cases, the recipient has already received or otherwise seen the previous comments in the thread, and thus the notification message includes only the most recent comment.

Figure 9B:
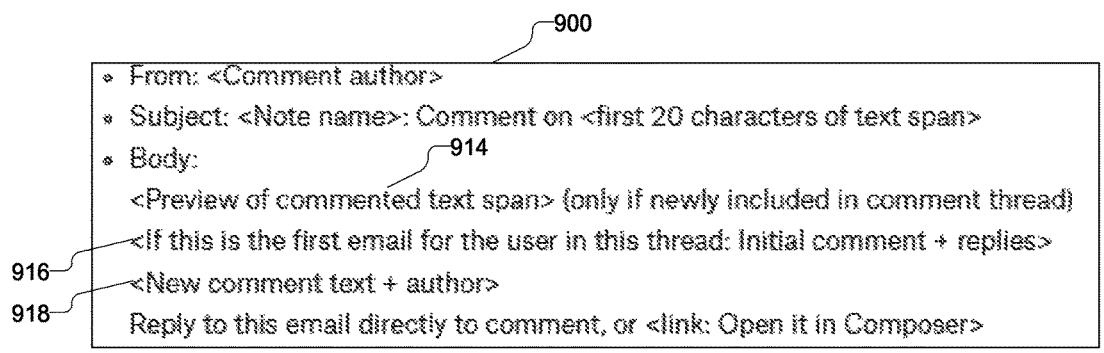

FIG. 9b shows an example of a template for an email 900 type notification message where the user is mentioned in a user primitive in the text of a comment itself. In this instance, the format is similar to that in FIG. 9a for the sender and subject line. Here, the body of the message includes a preview 914 of the commented text span only in the case that the user has not been included in the audience of the thread previously (since in that event the user would have already seen the text span). Similarly, if this is the first email to the user for this thread, then the body includes all of the comments 916 in the thread (i.e., the initial comment and all replies) since the user would not have seen these comments before, and would not have been included in the notification lists of such comments, even though the user is presently included in the audience for the thread (as a result of being mentioned in the next of the most recent comment). If this is not the first email to the user for this thread, then the initial comment and replies 916 are not included, as the user will have been included in the notification lists. In either case, the body includes the text 918 and author of the comment in which the user was mentioned by a user primitive. Again the notification message includes a link allowing the user to access the document comment in the document management system 130.

Determining the Audience of a Thread

Generally, the audience is determined when a thread is created, and then is subsequently updated as additional comments are included in the thread and users are mentioned in the text of comments. FIG. 10 one embodiment of a method for determining the audience for a thread.

Referring to FIG. 10, when a comment is created, the audience for a thread initially comprises the userID of the author of the document containing the thread and the author of the first comment included in the thread. Accordingly, if a new thread is being created, the document management system 130 adds 1004 the userID of the document author to audience. The document management system 130 adds 1006 the authorID of the comment author to the audience as well, if not already present in that list.

The audience for a thread also initially comprises the authors of any text included in the text span for the thread. For example, if a user creates a comment covering a span of text that three other users have previously edited, then these other users are included in the audience for the thread. This is beneficial because these other users are the individuals most likely to be interested in the initial user's comment. Accordingly, the document management system 130 adds 1008 to the audience the userIDs of authors of any text portions that overlaps with the text span for the thread, based on the author list for the document. This step occurs both for a new comment and when a reply comment is created. As described above, the author list is a list of userIDs of users who edited text in the document, and is coded as a sequence of (userID, span) pairs. For those userIDs for which the text portions that overlap with the text span of the thread, the authors of such text portions are added to the audience for the thread. A text portion can overlap the text span for a thread in different ways: (i) overlap the entire span; (ii) overlap the beginning of the span but not the end; (iii) overlap the end of the span but not the beginning; or (iv) fall entirely inside the span. These different types of overlaps can be identified by the following comparisons:

1) The text portion starts before the beginning of the text span and ends at any point after the beginning of the span. This rule covers types (i) and (ii).

2) The text portion starts between the beginning and an ending of the text span. This covers types (iii) and (iv).

For example, if the text span for the thread starts at character position 5 and ends at position 50 in a document, then the document management system 130 can traverse the author list and identify text portions that either i) start before position 5 and end after position 50; ii) start before position 5 and end between position 5 and position 50; iii) start between position 5 and position 50 and end after position 50; and iv) start and end between position 5 and position 50. The authors of these text portions would be included in the audience for the thread. Other sets of comparison rules that are equivalent can be derived.

The audience for a thread further preferably comprises any user mentioned in the text span of the thread via a user primitive and any user mentioned in a comment via user primitive. Inclusion of mentioned users is beneficial since it enables others to quickly engage the mentioned users in collaboration on the document, without having to communicate separately with such users via email, messaging, calendar invitations or like. For example, a first user can easily request a second user to review specific section of a document simply by mentioning that the second user via a user primitive in a comment associated with the desired section. Comment 504*d* in FIG. 5 illustrates an example with the inclusion of the user primitive 520 of "@Manny_Kant" in the text of the comment.

Accordingly, the document management system 130 scans the text span selected by the user and identifies user primitives of the form @username. The document management system 130 then looks up the userIDs for each username from the account database 316 using the account management module 304. These userIDs are added 1010 to the audience for the thread. Since changes in the content of the text span can occur after the original thread is created, and these changes can introduce a user primitive, this step is performed each time a comment is added to a thread.

The audience for a thread also preferably includes any user mentioned in the text of a comment via user primitive. This can also occur in the context of both a new thread, or a reply to a comment in an existing thread. Accordingly, the document management system 130 determines 1012 whether the text of the comment itself includes any user primitives. The document management system 130 then looks up the userIDs for each username from the account database 316 using the account management module 304. These userIDs are added to the audience for the thread. For example, referring back to FIG. 5, the comment 504*d* created by the user Tommy Kuhn would have as the audience the author of the document and the user Manny_Kant (due to primitive "@Manny_Kant" appearing in the comment 504*d* itself).

In the latter two cases, a user is included for the first time in the audience of a thread by virtue of being mentioned via user primitive (either in a recent edit to the text span or in last received comment), the userID for this user will not appear in the notification elements of the previously received comments. Accordingly, when generating the notification messages, the document management system 130 will selectively include the prior comments that have not been previously sent to the user in the notification message.

Selective Inclusion of Prior Comments in Notification Messages

As mentioned above with respect to FIG. 9*b*, when creating the notification message, the document management system 130 preferably determines whether the intended recipient user has seen previous comments in the thread, and if not the text of such comments is included in the notification message to the user. Where the user is receiving the comments in a thread as a result of having been mentioned in last received comment in thread via their user name in the user primitive form, the assumption is that this user may not have seen the previous comments. Accordingly, it is beneficial to include in the notification message the prior comments, as illustrated in FIG. 9*b*.

Accordingly, in one embodiment, the determination of which comments have not been previously seen by the user is based on the notification list included in each comment. As described above, each comment includes a notification list comprising the userID of all users to whom the comment has been previously sent. This list is updated each time the document management system 130 sends a notification of a comment to one or more users, by adding the userID obtained from the thread audience if they are not already included.

When a thread is created with a new comment, the notification list for that comment is initially empty. After the notification message is sent out the audience, the document management system 130 updates the notification list to include the userIDs included in the initial audience. Thus, the notification list of the comment will initially match the audience for the thread.

When a comment is created that includes a user primitive mentioning a user name, the userID for that mentioned user is added to the audience for the thread as described above. When the document management system 130 creates the notification message for this particular user (712, FIG. 7), it reads the notification list for each of the comments in the thread. If this userID does not appear in the notification list for a comment, then the comment text of that particular comment is inserted into the notification message, for example as illustrated in FIG. 9b. For example, if a user is mentioned in the comment text of the tenth comment in the thread, and this user has not been previously mentioned and has not previously contributed a comment to thread, then the user will receive a notification message containing the nine previous comments in element 916 (FIG. 9b) and the current tenth comment in element 918.

After a thread is started with respect to a text span in the document, another user ("second user") may edit text with the original span, for example by adding or deleting words, changing formatting or the like. The second user will be listed in the author list for the portion of text that they edited. Accordingly, at some later point after the second user's edits, another comment may be included in the existing thread, for example by a third user replying to a previous comment. When the reply comment is created and added to the thread, the document management system 130 would determine that the second user is to be included in the audience for the thread, because text portion for the second user overlaps the text span for the thread (see 1008, FIG. 10). Accordingly, when the document management system 130 creates the notification message, it traverses through the notification lists of all of the previous comments in the thread, comparing the userIDs in the audience of the thread to the userIDs in the notification lists. Because the second user has not received any of the previous comments, her userID will not be in the respective notification lists for the previous comments. Accordingly, the document management system 130 obtains the text of the previous comments, and includes them in the notification message for the second user.

For example, assume that user A has created a document in which user B has created a thread and new comment, comment 1. The audience for the thread is initially (A, B). The document management system 130 creates a notification message (as illustrated in FIG. 9a) and sends it to users A and B. The document management system 130 updates notification list for comment 1 is to (A, B).

Subsequently, user C adds a comment 2 to the thread by replying to comment 1. The audience for the thread is now (A, B, C). The document management system 130 generates a notification message for each of these users, including a link to comment 2. The document management system 130 then updates the notification lists of both comment 1 and comment 2 to (A, B, C).

Now assume that user B creates comment 3 in reply to comment 2, and includes in the text of the comment the user primitive "@D", indicating the user name of D. Users A, B, and C are listed in the audience for the thread, but user D is not. Similarly, users A, B, and C are each included in the notification lists of comments 1 and 2, but user D is not. When creating the notification messages, the document management system 130 determines that the notification lists for comments 1 and 2 already include user A, B and C, and thus the notification message is formatted as illustrated in FIG. 9a, with just text of comment 3 included in the body. However, for user D, the document management system 130 determines that user D is not included in the notification lists of comments 1 and 2. Accordingly, the document management system 130 formats the notification message to user D as illustrated in FIG. 9b, including in the body a preview 914 of the span of text that was originally commented up, the text of comments 1 and 2, and the text 918 of comment 3. In this fashion user D is made aware of the entire thread of comments and the specific text span being discussed, without having to access the underlying document in the document management system 130.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method in a document management system, wherein each user of the document management system is associated with a user identifier, the method comprising:
    storing a document in a document management system, wherein the document comprises text portions, each text portion authored by a user;
    receiving a comment for the document, the comment associated with a selected text span in the document;
    creating a thread, the thread having a comment list, a text span element, an audience, and a notification element;
    associating the selected text span with the text span element of the thread;
    associating the comment with the comment list of the thread;
    determining each user who authored a text portion of the document that overlaps the text span for the thread, and including the user identifier of each determined user in the audience element of the thread;
    identifying in the selected text span each user primitive mentioning a user, each user primitive comprising a predetermined token followed by a user name of a user, and including a user identifier associated with each identified user primitive in the audience element of the thread;
    transmitting to each user having a user identifier in the audience element of the thread a notification message, the notification message including a link including addressing information to access the document and the comment in the document management system.

2. The method of claim 1, further comprising:
    identifying in the received comment each user primitive mentioning a user; and including the user identifier associated with each identified user primitive in the audience element of the thread.

3. The method of claim 1, further comprising:
    updating a notification element of the comment to include the users to whom the notification message was transmitted.

4. The method of claim 1, wherein the notification message to an identifier user comprises:
    a subject line including an extract from the text span;
    a body including an entirety of the text span and the text of each comment that the user has not previously received.

5. The method of claim 1, further comprising:
    identifying in the selected text span each user primitive mentioning a user; and including the user identifier associated with each identified user primitive in the audience element of the thread.

6. The method of claim 1, wherein determining each user who authored a text portion of the document that overlaps the text span for the thread further comprises:
    storing for the document an author list indicating for sequential portions of text, an author of the portion and a length of the portion;
    comparing the selected text span with the author list to identify portions of text that overlap the text span; and
    determining the author of each text portion that overlaps the text span.

7. The method of claim 6, wherein a text portion overlaps the text span by either i) starting before a beginning of the text span and ending after the beginning of the text span, or ii) starting between a beginning and an ending of the text span.

8. A method in a document management system, wherein each user of the document management system is associated with a user identifier, the method comprising:
    storing a document in a document management system, wherein the document comprises text portions, each text portion authored by a user;
    receiving a first comment for the document, the comment associated with a selected text span in the document;
    creating a thread, the thread having a comment list, a text span element, an audience, and a notification element;
    associating the selected text span with the text span element of the thread;
    associating the comment with the comment list of the thread;
    receiving a plurality of comments for the document subsequent to the first comment;
    associating each of the plurality of comments with the comment list of the thread, each comment including comment text;
    identifying in at least one of the plurality of a comments a user primitive mentioning a user, the user primitive comprising a predetermined token followed by a user name of a user;

determining which of the prior comments received prior to the comment including the user primitive have not been sent to the mentioned user;

transmitting to the mentioned user a notification message, the notification message including a subject line including an extract from the text span, a body including an entirety of the text span and each comment that the user has not been previously sent to the user, and link including addressing information to access the document and the comments in the document management system.

9. The method of claim 8, wherein determining which of the prior comments received prior to the comment including the user primitive have not been sent to the mentioned user, further comprises:

storing for each of the first comment and the plurality of subsequent comments a notification element, the notification element including a list of users to whom the comment has been sent;

identifying each comment for which the user mentioned by the user primitive does not appear in the notification element of the comment; and including each identified comment as a prior comment that has not been sent to the mentioned user.

* * * * *

UNITED STATES PATENT AND TRADEMARK OFFICE
CERTIFICATE OF CORRECTION

PATENT NO. : 9,753,921 B1
APPLICATION NO. : 14/699997
DATED : September 5, 2017
INVENTOR(S) : Anthony DeVincenzi et al.

Page 1 of 1

It is certified that error appears in the above-identified patent and that said Letters Patent is hereby corrected as shown below:

In the Claims

Claim 1, Column 21, Line 65, delete "each user primitive" and insert --a user primitive--

Claim 4, Column 22, Line 20, delete "to an identifier user comprises:" and insert --to an identified user comprises:--

Claim 8, Column 22, Line 64, delete "identifying in at least one of the plurality of a comments" and insert --identifying in at least one of the plurality of comments--

Claim 8, Column 23, Lines 7 and 8, delete "each comment that the user has not been previously sent to the user," and insert --each comment that has not been previously sent to the user,--

Claim 8, Column 23, Line 8, delete "and link" and insert --and a link--

Claim 9, Column 23, Line 13, delete "the prior comments received prior to the comment" and insert --the comments received prior to the comment--

Signed and Sealed this
Second Day of January, 2018

Joseph Matal
*Performing the Functions and Duties of the
Under Secretary of Commerce for Intellectual Property and
Director of the United States Patent and Trademark Office*